United States Patent [19]

Uchikawa

[11] Patent Number: 5,549,080
[45] Date of Patent: Aug. 27, 1996

[54] APPARATUS AND METHOD FOR DIAGNOSING OCCURRENCE OF FAILURE IN VARIABLE VALVE TIMING CONTROL SYSTEM FOR INTERNAL COMBUSTION ENGINE

[75] Inventor: Akira Uchikawa, Atsugi, Japan

[73] Assignee: Unisia Jecs Corporation, Atsugi, Japan

[21] Appl. No.: 430,725

[22] Filed: Apr. 28, 1995

[30] Foreign Application Priority Data

Apr. 28, 1994 [JP] Japan ............................ 6-091447

[51] Int. Cl.⁶ ............................ F01L 1/34; F02D 41/22
[52] U.S. Cl. ............................ 123/90.16; 123/198 D
[58] Field of Search ............................ 123/90.15, 90.16, 123/90.17, 198 D

[56] References Cited

U.S. PATENT DOCUMENTS

| | | | |
|---|---|---|---|
| 4,592,310 | 6/1986 | Hitomi et al. | 123/90.15 |
| 4,876,995 | 10/1989 | Otobe et al. | 123/90.16 |
| 4,996,954 | 3/1991 | Seki et al. | 123/90.16 |
| 5,060,604 | 10/1991 | Seki et al. | 123/90.16 |
| 5,150,671 | 9/1992 | Suga | 123/90.17 |
| 5,195,471 | 3/1993 | Hara | 123/90.17 |
| 5,197,421 | 3/1993 | Hara | 123/90.17 |
| 5,203,289 | 4/1993 | Hara et al. | 123/90.16 |
| 5,203,290 | 4/1993 | Tsuruta et al. | 123/90.17 |
| 5,205,248 | 4/1993 | Hara et al. | 123/90.17 |
| 5,209,193 | 5/1993 | Uchida et al. | 123/90.17 |
| 5,216,987 | 6/1993 | Clarke | 123/90.15 |
| 5,228,417 | 7/1993 | Hara | 123/90.17 |
| 5,247,914 | 9/1993 | Imai et al. | 123/90.17 |
| 5,263,442 | 11/1993 | Hara | 123/90.17 |
| 5,309,873 | 5/1994 | Suga et al. | 123/90.17 |
| 5,353,755 | 10/1994 | Matsuo et al. | 123/90.13 |

FOREIGN PATENT DOCUMENTS 6-10260  3/1994  Japan .

OTHER PUBLICATIONS

"New Model Introduction of Nissan Cima (FGY32-1)", Nissan Motor Co., Aug., 1991, pp. B-19, 20, 44 and 45.

Primary Examiner—Weilun Lo
Attorney, Agent, or Firm—Foley & Lardner

[57] ABSTRACT

In a diagnosing apparatus and method for an internal combustion engine having a variable valve timing control system, the apparatus and method diagnose whether the variable valve timing control system actually switches the valve timings according to a switching between an operation and non-operation of the variable valve timing control system, utilizing a variation occurrence in an intake air pulsation in response to the switching between an operation mode and non-operation mode of the variable valve timing control system.

21 Claims, 8 Drawing Sheets

SOLENOID ON (POWER IS SUPPLIED)

FIG.3

SOLENOID OFF (POWER SUPPLY IS INTERRUPTED)

FIG.4A (CONT. "OFF")

APPARATUS AND METHOD FOR DIAGNOSING OCCURRENCE OF FAILURE IN VARIABLE VALVE TIMING CONTROL SYSTEM FOR INTERNAL COMBUSTION ENGINE

BACKGROUND OF THE INVENTION

The present invention relates to an apparatus and method for diagnosing occurrence of failure in a variable valve timing control system for an internal combustion engine in which the variable valve timing control system is mounted.

U.S. Pat. Nos. 5,203,289 (issued on Apr. 20, 1993), 5,150,671 (issued on Sep. 29, 1992), 5,209,193 (issued on May 11, 1993), 5,205,248 (issued on Apr. 27, 1993), 5,195,471 (issued on Mar. 23, 1993), 5,228,417 (issued on Jul. 20, 1993), 5,228,417 (issued on Jul. 20, 1993), 5,247,914 (issued on Sep. 28, 1993), 5,197,421 (issued on Mar. 30, 1993), 5,263,442 (issued on Nov.23, 1993), 5,203,290 (issued on Apr. 20, 1993), 5,309,873 (issued on May 10, 1994), and 5,353,755 (issued on Oct. 11, 1994) exemplify variable valve timing control systems for internal combustion engines.

In general, in an internal combustion engine, if a timing at which an intake valve(s) is closed is earlier than usual, an intake air sucking efficiency is improved in low engine speed or middle speed ranges. On the other hand, in a high speed range, if the timing at which the intake valve(s) is closed is later than usual, the intake air sucking efficiency is improved. Consequently, an improvement in an engine output torque can be achieved.

Therefore, such a variable valve timing control system as described in each of the above-identified United States Patents has been proposed in which a variable valve timing mechanism is operated according to an engine driving condition, the variable valve timing mechanism switching an open-and-closure timing of an engine intake valve(s). When the engine falls in a high engine revolution speed range and in a high load condition, an overlap time duration during which the intake valve and exhaust valve are open is elongated so that an air filling efficiency can be improved utilizing an intake air inertia force.

Such a variable valve timing control system as described above is abbreviated VTC and is called an NVCS in a Japanese Service Manual (New Model Introduction of Nissan "Cima" (FGY32-1) published on August, 1991.

In the VTC, for example, a control signal is output from a control unit, the control unit receiving an engine revolution speed indicative signal and intake air quantity indicative signal, to a variable timing control solenoid. The solenoid is excited (in an ON state) or turned off (in an OFF state) so that a hydraulic is controlled to operate the variable valve timing mechanism, thus carrying out a switching control over the open-and-closure timings of the intake valve(s).

In the VTC described above, in a case where an electrical failure in an output system of the control signal and/or a mechanical failure in the variable valve timing mechanism occurs so that a malfunction of the variable valve timing control system results, a higher engine revolution is required in order to achieve the same engine output as when the VTC is operated. In addition, an exhaust gas emission quality is worsened.

Hence, it is essential to carry out a self diagnosis for the VTC with less cost.

SUMMARY OF THE INVENTION

It is therefore a principal object of the present invention to provide an apparatus and method for easily diagnosing occurrence of failure in a variable valve timing control system for an internal combustion engine, with no special device for the diagnosis, to respond to an industrial demand of providing such a self-diagnosis apparatus and method.

The above-described object can be achieved by providing a diagnosing apparatus for an internal combustion engine, comprising: a) a variable valve timing mechanism which is constructed and arranged on a cam sprocket of an intake air system so as to variably control a phase between an engine crankshaft and intake air system cam shaft; b) solenoid means for controlling a hydraulic supply to operate the variable valve timing mechanism to control said phase at a first phase deviation in response to a predetermined control signal and not to operate the variable valve timing mechanism to return said phase to a second phase deviation in response to a predetermined non-control signal; c) engine driving condition detecting means for detecting an engine driving condition; d) controlling means for generating and outputting said control signal and non-control signal according to the detected engine driving condition; e) intake air quantity detecting means for detecting an intake air quantity for an intake air flow in the intake air system of the engine; f) intake air pulsation generating region estimating means for estimating whether the engine falls in an intake air pulsation region according to the detected engine driving condition; g) first intake air pulsation characteristic determining parameter measuring means for measuring a first value of a characteristic determining parameter of the intake air pulsation on the basis of a result of the detection of the intake air quantity detecting means when the intake air pulsation generating region estimating means estimates that the engine falls in the intake air pulsation region and when the control and non-control signal generating means generates and outputs the predetermined control signal to said solenoid means; h) second intake air pulsation characteristic determining parameter measuring means for measuring a second value of the characteristic determining parameter of the intake air pulsation when the control and non-control signal generating means generates and outputs the non-control signal to said solenoid means; i) intake air pulsation characteristic determining parameter comparing means for comparing both of said first and second values of the characteristic determining parameter of intake air pulsations measured by said first and second characteristic determining parameter measuring means; and j) diagnosing means for diagnosing whether a failure in at least either of said variable valve timing mechanism or solenoid means occurs on the basis of a result of comparison between the first and second values of the characteristic determining parameter of the intake air pulsations measured by said first and second intake air pulsation characteristic determining parameter measuring means.

The above-described object can also be achieved by providing a diagnosing apparatus for an internal combustion engine, comprising: a) a variable valve timing control system having a solenoid, said solenoid being excited in response to a first predetermined level signal and being deenergized in response to a second predetermined level signal; b) an intake airflow meter which is so constructed and arranged in an intake air system of the engine as to detect an intake air quantity sucked into the engine and output a signal indicating the intake air quantity; c) engine driving condition detecting means for detecting at least one engine driving condition determining parameter; d) intake air pulsation region determining means for determining whether the engine falls in such an engine driving region that the intake air pulsation occurs on the basis of the engine driving condition determining parameter of said engine driving condition detecting means; e) first intake air pulsation period measuring means for measuring at least either a first intake air pulsation period or frequency of the intake air pulsation when said variable valve timing control system is operated according to the excited solenoid in response to the first predetermined level signal and when said intake air pulsation region determining means determines that the engine falls in the intake air pulsation engine driving region; f) second intake air pulsation period measuring means for measuring at least either a second intake air pulsation period or frequency of the intake air pulsation when said variable valve timing control system is not operated according to the deenergized solenoid in response to the second predetermined level signal and when said intake air pulsation region determining means determines that the engine falls in the engine driving region where the intake air pulsation occurs; g) intake air pulsation comparing means for comparing both of said first and second intake air pulsation periods or frequencies; and h) determining means for determining whether a failure in said variable valve timing control system occurs according to a result of the comparison between the first and second intake air pulsation periods or frequencies.

The above-described object can also be achieved by providing a diagnosing method for an internal combustion engine having a variable valve timing control system having a solenoid, said solenoid being excited in response to a first predetermined level signal so that the variable valve timing control system is operated and being deenergized in response to a second predetermined level signal so that the variable valve timing control system is not operated, said diagnosing method comprising the steps of: a) detecting an intake air quantity of the engine and outputting a signal indicating the intake air quantity; b) detecting at least one engine driving condition determining parameter; c) determining whether the engine falls in such an engine driving region that the intake air pulsation occurs, on the basis of the engine driving condition determining parameter; d) measuring at least either a first intake air pulsation period or frequency of the intake air pulsation when said variable valve timing control system is operated according to the excited solenoid in response to the first predetermined level signal and when, at the step c), it is determined that the engine falls in the intake air pulsation engine driving region; e) measuring at least either a second intake air pulsation period or frequency of the intake air pulsation when said variable valve timing control system is not operated according to the deenergized solenoid in response to the second predetermined level signal and when, at the step c), it is determined that the engine falls in the engine driving region where the intake air pulsation occurs; f) comparing both of said first and second intake air pulsation periods or frequencies; and g) determining whether a failure in said variable valve timing control system occurs according to a result of comparison between the first and second intake air pulsation periods or frequencies at the step f).

BEST MODE CARRYING OUT THE INVENTION

Reference will hereinafter be made to the drawings in order to facilitate a better understanding of the present invention.

Figure 1A:
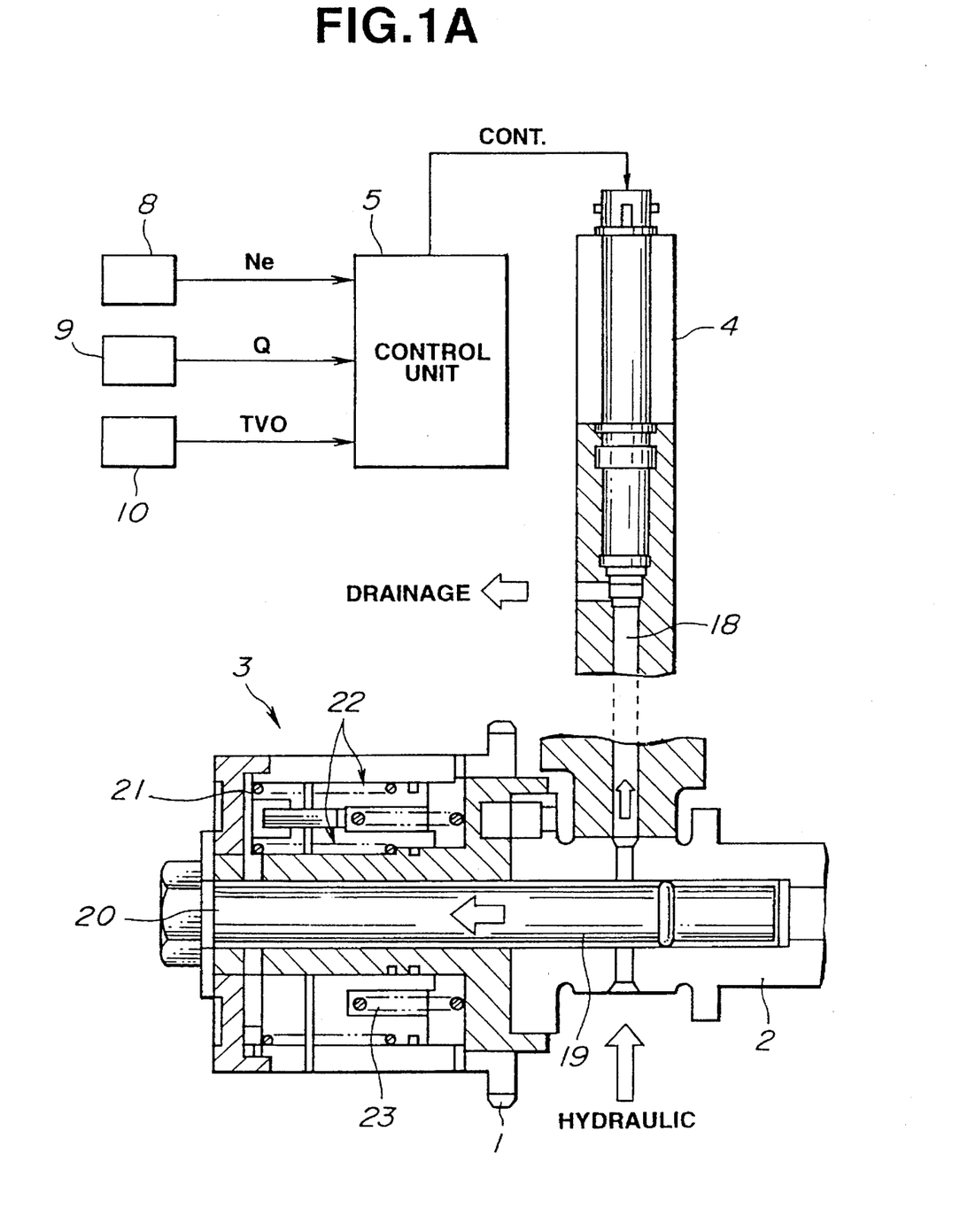
FIG. 1A is a circuit block diagram of a diagnosing apparatus for a variable valve timing control system in a preferred embodiment according to the present invention.
Figure 1B:
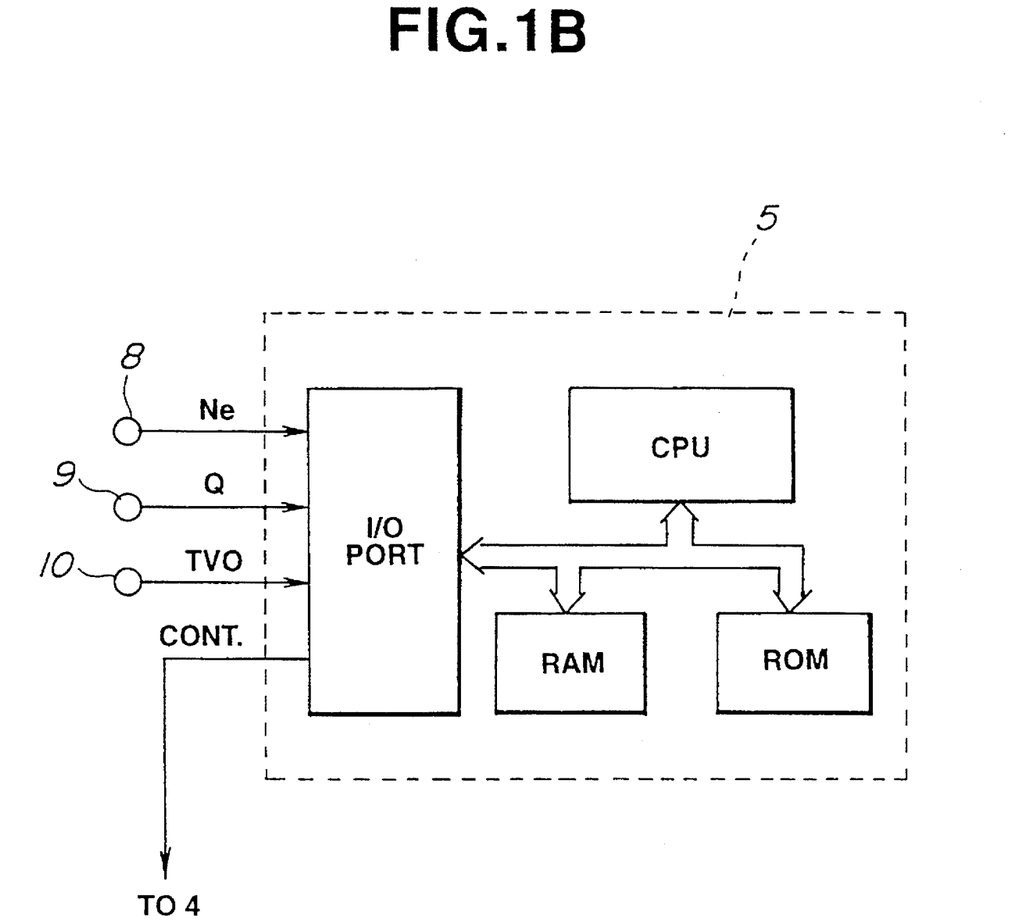
FIG. 1B is a circuit block diagram of a control unit shown in FIG. 1A.

FIGS. 1A and 1B show a variable valve timing control system (hereinafter, abbreviated as VTC) to which a diagnosing apparatus and method for diagnosing occurrence of failure in the variable valve timing control system in a preferred embodiment according to the present invention is applicable.

It is noted that an internal combustion engine to which the present invention is applicable is provided with an intake air system cam shaft and an exhaust gas system cam shaft which are independent of each other.

The VTC is attached onto an intake air system cam sprocket 1 and includes: a variable valve timing mechanism 3 which variably controls a phase between an engine crankshaft (not shown) and intake air system cam shaft 2; a variable valve timing control solenoid 4 which controls a hydraulic supply to operate the variable valve timing mechanism 3; and a control unit 5 which outputs a control signal having a level to excite the solenoid 4 so that the variable valve timing mechanism 3 is operated and outputs a non-control signal having a level to deenergize the solenoid 4 so that the variable valve timing mechanism 3 is not operated, the outputs of these control and non-control signals being dependent on an engine driving condition. The control unit 5, as shown in FIG. 1B, generally includes: a CPU (Central Processing Unit), RAM (Random Access Memory), ROM (Read Only Memory) and a common bus.

Figure 2:
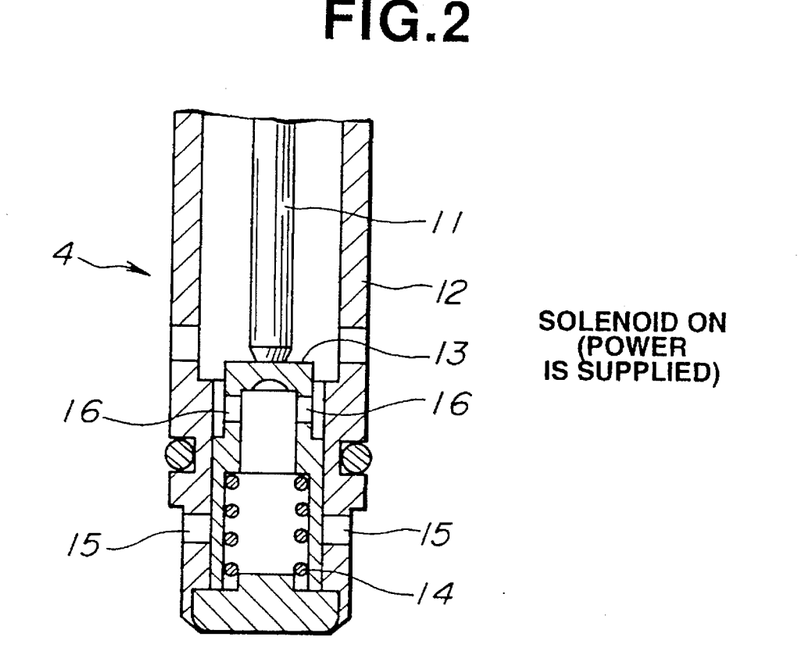
FIG. 2 is an explanatory view for explaining a hydraulic control state when a solenoid of the variable valve timing control system shown in FIG. 1 is powered (excited).
Figure 3:
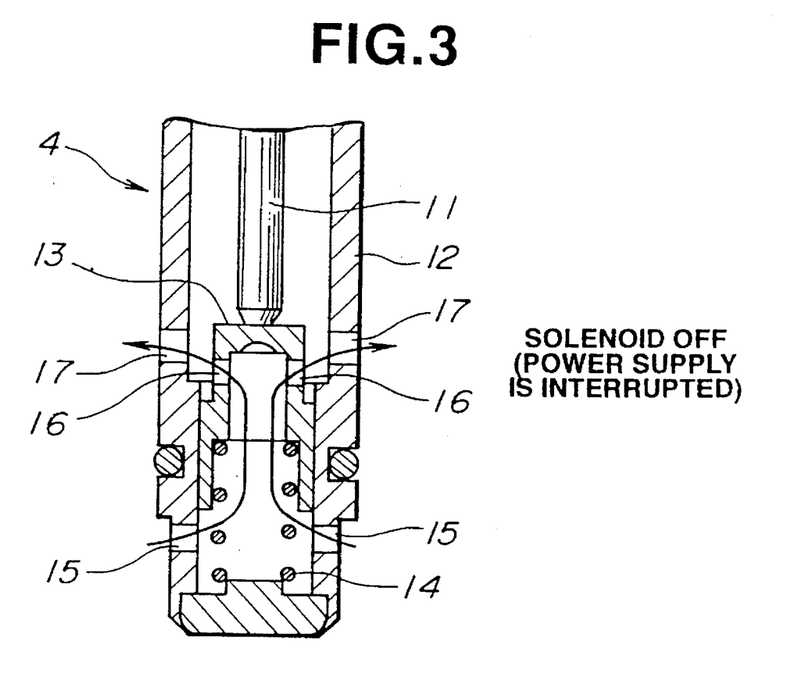
FIG. 3 is an explanatory view for explaining a hydraulic control state when the solenoid of the variable valve timing control system shown in FIG. 1 is not powered (deenergized).

FIGS. 2 and 3 show the solenoid 4 and its surrounding structure when the control signal is received and when the non-control signal is received, respectively.

When the non-control signal is received by the solenoid 4, the solenoid 4 is turned off (deenergized) so that a rod 11 extended along a hollow portion of the solenoid 4 is pulled upward so as to approach an upper side of the solenoid 4. On the other hand, when the control signal is received by the solenoid 4, the solenoid is turned on (excited) so that the rod 11 is pushed toward the lower side of the solenoid 4.

A valve body 13 of a cylindrical shape which moves in an axial direction along an inner peripheral surface of a housing 12 is disposed onto a lower tip end of the housing 12, the housing 12 being supported so as to enclose the rod 11. The valve body 13 is biased toward the rod 11 by means of a coil spring 14, the biasing force causing the valve body 13 to be brought in contact with a lower tip of the rod 11. Consequently, the valve body 13 is moved in the axial direction together with the movement of the rod 11.

A working oil is pressurized and supplied from a hydraulic source (not shown) to an introduction hole 15. The introduction hole 15 serves to introduce the working oil into a space enclosed by means of an inner periphery of the housing 12 and an inner side of the valve body 13. A communication hole 16 is open in the valve body 13 and serves to drain the working oil introduced via the introduction hole 15 into a space enclosed by an inner periphery of the housing 12 outside of the valve body 13 and an outer periphery of the rod 11. Furthermore, a drain hole 17 is open on a peripheral wall of the housing 12 so as to be exposed to a space enclosed by an inner periphery of the housing 12 and an outer periphery of the rod 11.

When the non-control signal is received by the variable valve timing solenoid 4, namely, no power supply is received by the solenoid 4, the rod 11 is retracted toward the solenoid 4 so that the valve body 13 is separate from the lower tip of the rod 11. In this state, both the peripheral wall of the valve body 13 and the introduction hole 15 are not interfered with and the working oil is introduced into the housing 12 via the introduction hole 15 and drained via the drain hole 17.

On the other hand, when the variable valve timing control solenoid 4 is turned on (energized or excited) in response to the control signal from the control unit 5, the rod 11 is pushed toward the valve body 13 so that the valve body 13 is moved downward to cause a lower tip of the housing 12 and the peripheral wall of the valve body 13 to be closed from the valve body surrounding space. Consequently, the working oil is not drained via the drain hole 17.

A working oil passage 18 shown in FIG. 1A is communicated with another working oil passage 19 provided in the variable valve timing mechanism 3 upstream of the working oil.

Thus, in a case where the solenoid 4 is turned off (in the deenergized state), the working oil is drained via the drain hole 17 so that the hydraulic force does not act upon the variable valve timing mechanism 3. On the contrary, in a case where the solenoid 4 is turned on (in the excited (ON) state), the drain hole 17 is closed so that the hydraulic force acts upon the variable valve timing mechanism 3.

As described above, since the working oil passage 18 is communicated with the working oil passage 19 disposed on the cam shaft 2 before reaching to the solenoid 4, with the solenoid 4 being turned on and the working oil being not drained from the side of the solenoid 4, the working oil supplied to the other working oil passage 19 has arrived at a front surface of a plunger 21 built in the cam sprocket 1 via a working oil passage 20 disposed within the cam sprocket 1. The working oil which has reached to the front surface of the plunger 21 is acted so as to push the plunger 21 toward the cam shaft 2 under its hydraulic action.

A helical gear 22 meshes the plunger 21 with the cam sprocket 1 and cam shaft 2. Hence, when the plunger 21 is pushed hydraulically, the plunger 21 is rotated and displaced in the axial direction up to a stopper position. Since the cam sprocket 1 is fixed to a timing chain (not shown), the cam shaft 2 is rotated together with the plunger 21 so that a relative displacement between the cam sprocket 1 and cam shaft 2 in its peripheral direction is varied.

On the other hand, when the solenoid 4 is deenergized (turned off, in the OFF state), the working oil is drained via the drain hole 17 so that a force pushing the plunger 21 toward the side of the cam shaft 2 disappears, thereby the plunger 21 being returned to the original position away from the cam shaft 2 by means of the biasing force of a return spring 23.

Figure 4A:
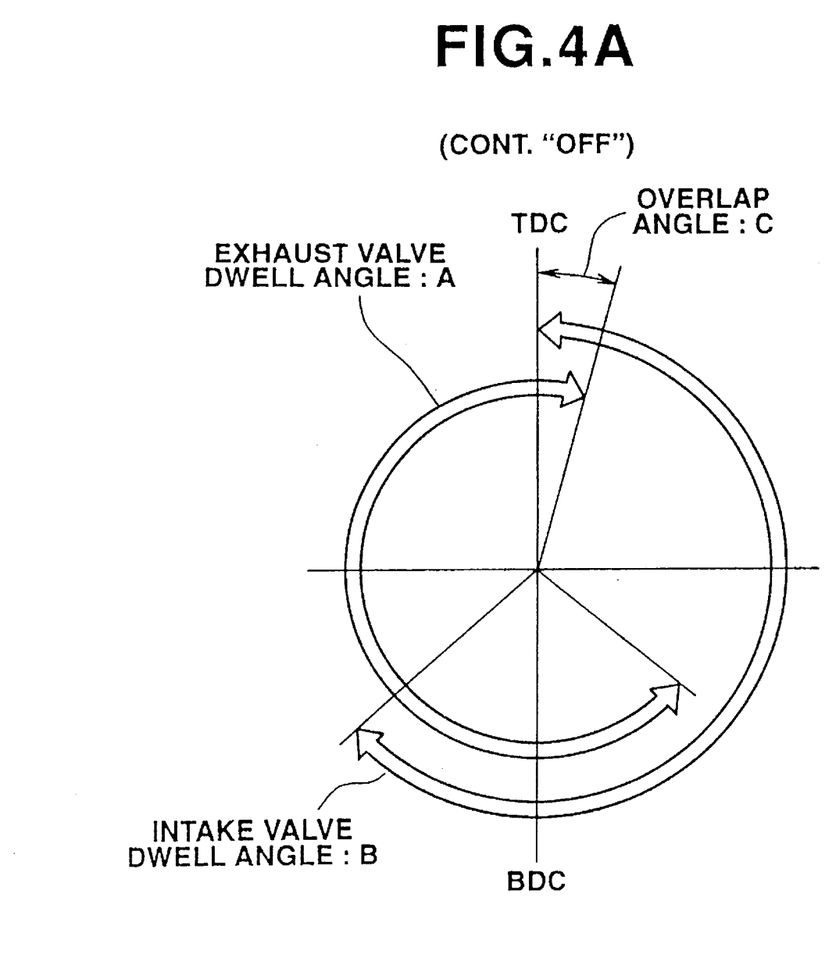
FIGS. 4A and 4B are explanatory views for explaining a change in intake valve open and closure timings due to the solenoid excited and deenergized states in response to a turned-on control signal and a turned-off control signal.
Figure 4B:
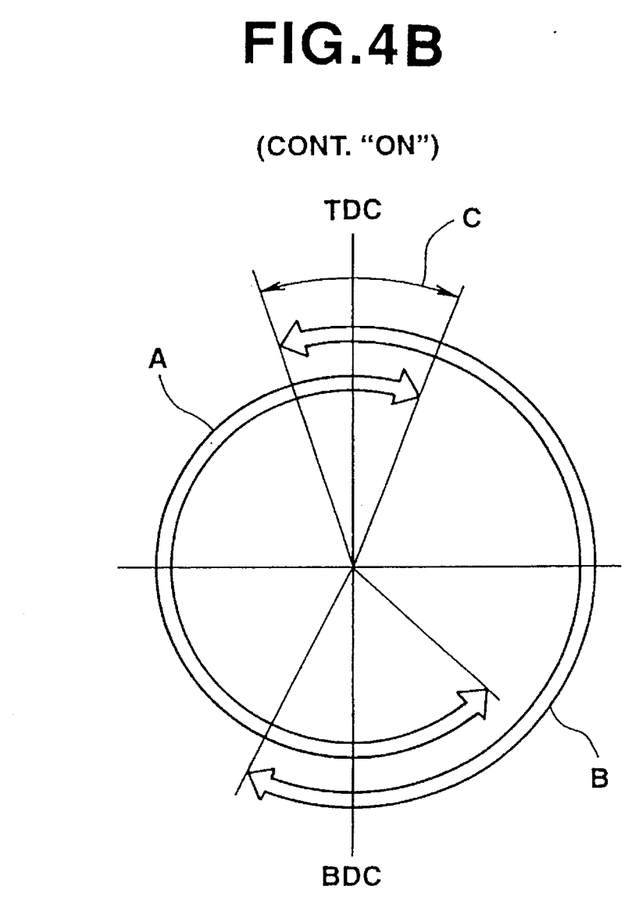

As described above, in the VTC in the embodiment, the phase of the intake air system cam shaft 2 with respect to that of the crankshaft is varied so that the phase of the intake air system cam is varied with its working angle (dwell angle) maintained constant. In this embodiment, as shown in FIGS. 4A and 4B, an open timing of the intake valve(s) is retarded with the solenoid 4 in the off state. On the contrary, with the solenoid 4 in the on state, the open timing is earlier because an overlap angular displacement between the intake valve (s) and exhaust valve(s) is increased.

In FIGS. 4A and 4B, TDC denotes a Top Dead Center (an uppermost position at which the cylinder piston arrives), BDC denotes a Bottom Dead Center (a bottom position at which the cylinder piston arrives), A denotes an angular displacement (also called dwell angle) during which the exhaust valve is moved from a full open position to a full closure position, and B denotes an angular displacement during which the intake valve is moved from a full open position to a full closure position.

In FIG. 4A, the non-control signal is received by the solenoid 4 so that the variable valve timing mechanism 3 is not operated. In this state, an overlap valve angular displacement C after the TDC is relatively small.

In FIG. 4B, the control signal is received by the solenoid 4 so that the variable valve timing mechanism 3 is operated. In this state, the overlap valve angular displacement C after and before the TDC is relatively large.

Referring back to FIGS. 1A and 1B, the solenoid on (excited) and off (deenergized) states are controlled in response to the control and non-control signals output from the control unit 5. The control unit 5 turns on or off the solenoid 4 according to the engine driving condition so that the open and closure timings of the intake valve(s) are varied so as to accommodate the engine driving condition. The control unit 5, thus, receives an output signal of a crank angle sensor 8 to determine an engine revolution speed N on the basis of the output signal of the crank angle sensor 8 and receives the output signal of an airflow meter 9 to determine an intake air quantity Q on the basis of the output signal of the airflow meter 9.

The airflow meter 9 is exemplified by a U.S. Pat. application Ser. No. 07/397,039 filed on Feb. 27, 1995 having a priority based on Japanese Patent Applications No.

6-150429 and 6-54624 (attorney docket No. ISPC 32926/915) (which corresponds to a British Patent Application No. 9504022.6 filed on Feb. 28, 1995), the disclosure of which is herein incorporated by reference.

The variable valve timing mechanism is also exemplified by FIG. 7 of a U.S. Pat. No. 5,353,755 issued on May 25, 1993, the disclosure of which is herein incorporated by reference.

Figure 5:
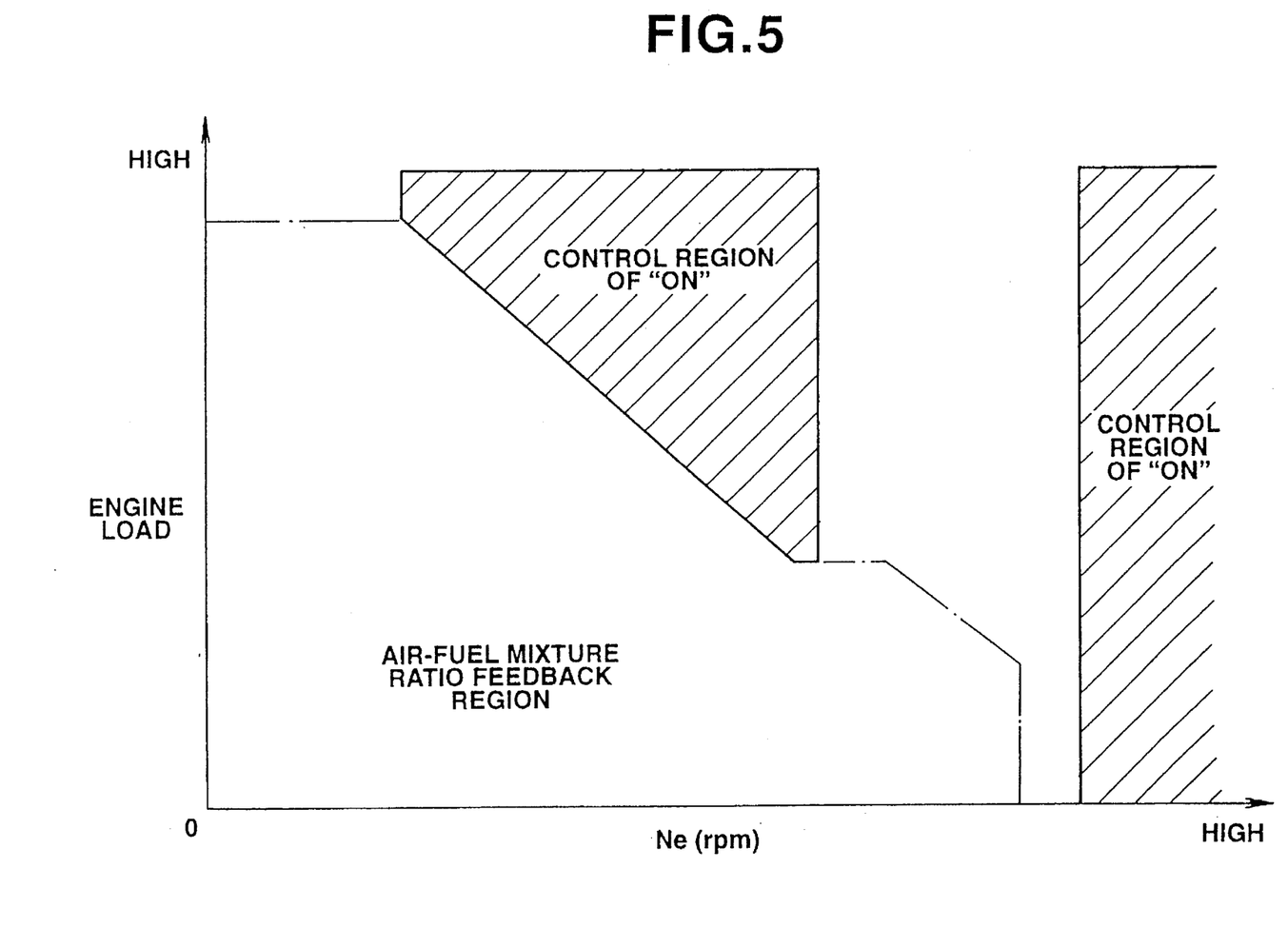
FIG. 5 is a characteristic graph indicating valve timing control system ON and OFF driving conditions of the control signal supplied to the solenoid.

The control unit having the microcomputer 5 calculates an engine load corresponding value from the intake air quantity Q and engine revolution speed N, referring to a valve timing control map of FIG. 5 set with the engine load Q and engine revolution speed N as parameters (using a table look-up technique) to determine the ON and OFF of the solenoid 4, and outputs the solenoid ON and solenoid OFF (control and non-control) signals according to the determined ON and OFF of the solenoid 4.

It is noted that the airflow meter 9 adopted in the embodiment is a type of airflow meter which detects the intake air quantity with respect to the intake air flow in the normal or reverse direction with respect to the engine cylinders in order to carry out the self diagnosis of the VTC.

The control unit 5 receives an opening angle indicative signal of an engine throttle valve opening angle sensor 10.

Figure 6:
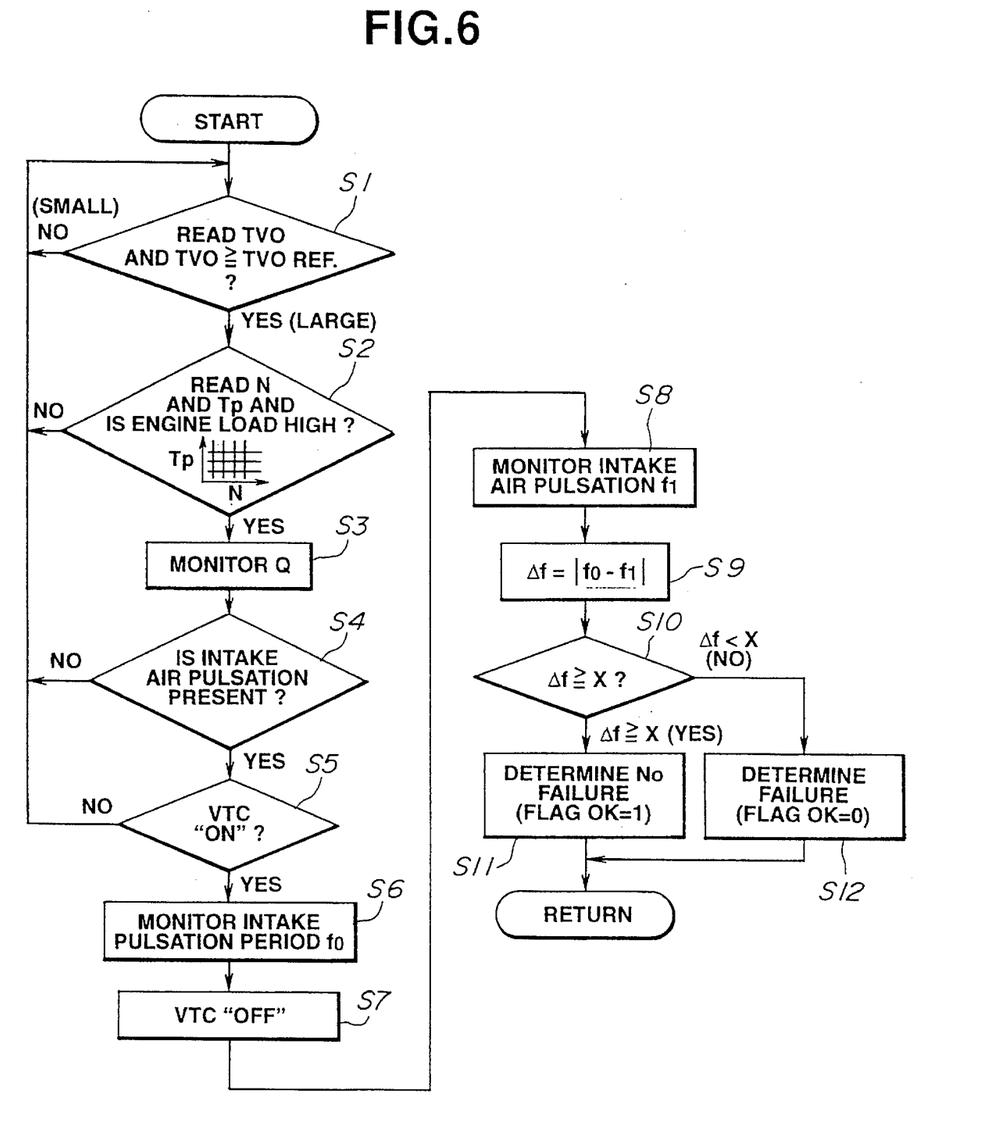
FIG. 6 is an operational flowchart executed in the diagnosing apparatus shown in FIG. 1.

A diagnostic routine executed by the microcomputer in the control unit 5 is shown in FIG. 6.

At a first step S1, the CPU reads an opening angle in degrees signal TVO from the throttle valve opening angle sensor 10 and determines whether the engine throttle valve is fully open (TVO$\geq$TVOR$_{REF}$, TVOR$_{REF}$ denotes a value in degrees indicating that the throttle valve is generally full open). If No at the step S1, the loop of start and step S1 is repeated until the throttle valve is determined to be full open. Alternatively, if No at the step S1, the routine at the present time may be finished.

If Yes at the step S1, namely, TVO$\geq$TVO$_{REF}$, the routine goes to a step S2.

At the step S2, the CPU calculates the engine revolution speed N from the read output signal of the crank angle sensor 8, reads a basic fuel injection quantity Tp used for the fuel injection quantity control system and calculated as Tp=k·Q/N, (Q denotes the intake air quantity and k denotes a constant) and looks up a table map from the read basic fuel injection quantity value Tp and engine revolution speed N to determine whether the engine falls in a high load region.

If Yes at the step S2, namely, the engine falls in the high load region, the routine goes to a step S3. If No at the step S2, the routine returns to the start portion of the flowchart shown in FIG. 6.

It is noted that steps S1 and S2 function to determine whether the engine falls in an intake air pulsation (ripple or undulation) occurring region. That is to say, the intake air pulsation generally appears in a region in proximity to a region in which the engine throttle valve is fully open. Hence, the CPU estimates that the engine falls in the intake air pulsation occurring region by determining that the engine falls in the intake air pulsation region where the throttle valve is fully open and that the engine is in the high load region.

At the step S3, the CPU carries out an analog-to-digital conversion for a voltage signal Us output from the airflow meter 9 and which is in accordance with the detected intake air quantity Q via the I/O port and monitors the output voltage signal Us.

Then, at a step S4, the CPU determines whether the monitored output voltage signal Us indicating the detected intake air quantity Q really exhibits the intake air pulsation, i.e, determines whether the engine really fails in the intake air pulsation occurring region.

If Yes at the step S4, namely, the CPU determines that the engine really falls in the intake air pulsation occurring region, the routine goes to a step S5. If No at the step S4, the routine returns to the step S1.

At the step S5, the CPU determines whether the VTC shown in FIG. 1 is being operated, namely, the solenoid 4 is being energized (turned ON) in response to the control signal. Specifically, at the step S5, the CPU confirms whether the control signal to excite the solenoid 4 is output to operate the VTC.

If No at the step S5, the routine returns to the step S1.

If Yes at the step S5, the routine goes to a step S6.

At the step S6, the CPU monitors and measures a first intake pulsation period fo of the intake air when the VTC is operated, namely, when the solenoid 4 is excited (on state). For the first intake air pulsation period of, refer to FIG. 7A.

Next, at a step S7, the CPU commands the I/O port to forcefully output the non-control signal to the solenoid 1 (or to halt the output of the control signal so that the VTC is forced into the non-operated state (the solenoid in the on state is forcefully turned off (deenergized)) in order to diagnose the VTC.

At a step S8, the CPU monitors and measures a second intake air pulsation period f1 with the solenoid 4 turned off on the basis of the output voltage signal Us from the airflow meter 9. For the second intake air pulsation period f1, refer to FIG. 7B.

At the next step S9, the CPU calculates an absolute value of a difference between the first intake air pulsation period fo and second intake air pulsation period f1 measured at the steps S6 and S8: $\Delta f=|f0-f1|$.

At a step S10, the CPU compares the absolute value $\Delta f$ with a reference value X.

If $\Delta f \geq X$ at the step S10 (Yes) the CPU determines, at a step S11, that no failure in the VTC occurs (namely, normally functions) and, for example, sets a flag FLGOK to 1.

If $\Delta f<X$ at the step S10, the CPU determines, at a step S12, that the VTC has failed (namely, the VTC malfunctions) and, for example, resets a flag FLGOK to 0.

It is noted that, for example, a warning lamp is connected to the control unit 5 and is turned on in response to FLGOK=0.

Figure 8:
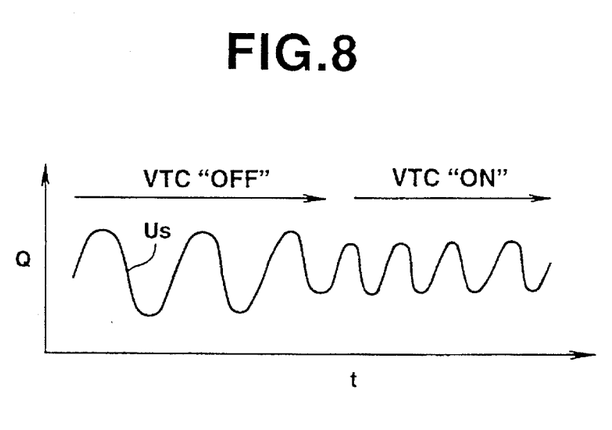
FIG. 8 is a characteristic graph representing measured intake air pulsation periods from an output signal of an airflow meter when the variable valve timing control system is not operated ("OFF") and the variable valve timing control system is operated ("ON").

In details, when the valve timing is switched according to the switch between the operated state of the VTC and the non-operated state, the intake air pulsation period is varied in response to the valve timing switching as appreciated from FIG. 8. However, in a case where the variation of the intake air pulsation period ($\Delta f$) is small even though the valve timing is switched, the control unit 5 determines that the desired valve timing switching control is not carried out due to a failure in the VTC so that the control unit 5 can diagnose the failure in the VTC.

Hence, if $\Delta f \geq X$, the control unit 5 normally outputs the control signal and non-control signal to excite and deenergize the solenoid 4 so that the desired valve timing is actually switched between the states shown in FIGS. 4A and 4B, and the intake air pulsation periods are appropriate. Consequently, the control unit 5 can determine that no failure in the VTC occurs.

On the other hand, if $\Delta f<X$, although the control unit 5 normally outputs the control signal and non-control signal to excite and deenergize the solenoid 4, the VTC does not provide the desired valve timing switching and the intake air pulsation periods in response to the turning on and off (excitation and deenergization) of the solenoid 4 is inappropriate. Consequently, the control unit 5 determines that a failure in the VTC occurs.

According to the diagnostic routine for the VTC shown in FIG. 6, the self-diagnosis of an electrical failure in the output system of the control signal and the non-control signal, a mechanical failure in the variable valve timing mechanism, and so forth can be achieved.

Consequently, an appropriate countermeasure for the failure in the VTC can be carried out when the failure in the VTC occurs and the VTC malfunctions.

Since no special device to determine the occurrence of failure is needed, a cost performance can be improved.

Figure 9A:
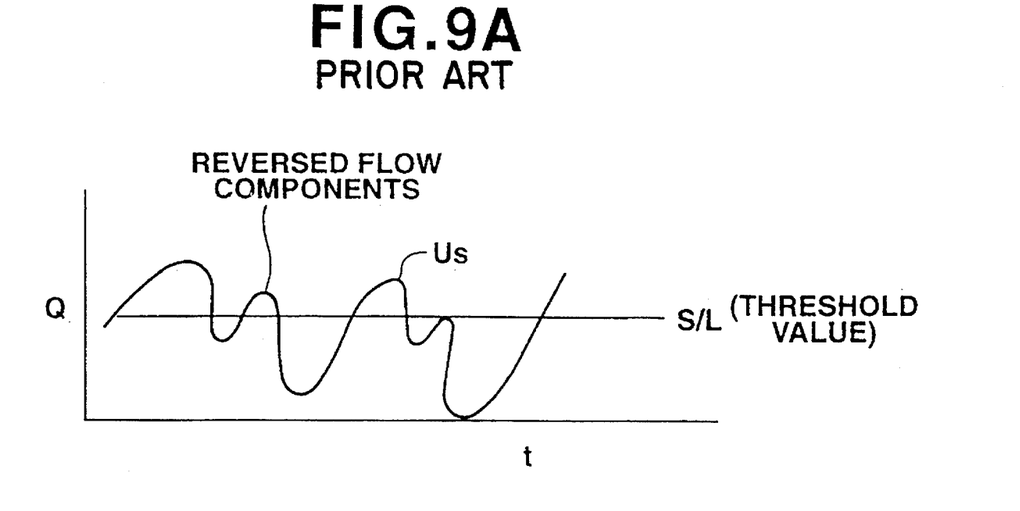
FIGS. 9A and 9B respectively output voltage waveforms Us when a reverse flow of intake air occurs in a case where a conventional airflow meter detects the intake air flow quantity in a forward direction of an air flow stream to the engine cylinders and an airflow meter is used in the embodiment shown in FIG. 1A and detects the intake airflow quantity in both forward and opposite directions of the air flow stream with respect to the engine cylinders.

FIG. 9A shows the output voltage signal waveform Us from a conventional type of airflow meter which detects the intake air quantity Q with respect to the intake air flow in the forward direction. The forward direction means the direction of the air stream in the intake air system of the engine toward the engine cylinders. A reverse direction means the direction of the air stream in the intake air system of the engine opposite to the engine cylinders.

Such a conventional airflow meter as described above outputs the voltage signal Us indicating the intake air quantity Q as shown in FIG. 9A. In a case where the intake air flow in the reverse direction occurs, a reverse direction component is output as shown in FIG. 9A. As appreciated from FIG. 9A, the intake air pulsation period cannot accurately be measured. Consequently, an accurate self-diagnosis of failure in the VTC cannot be made.

Figure 9B:
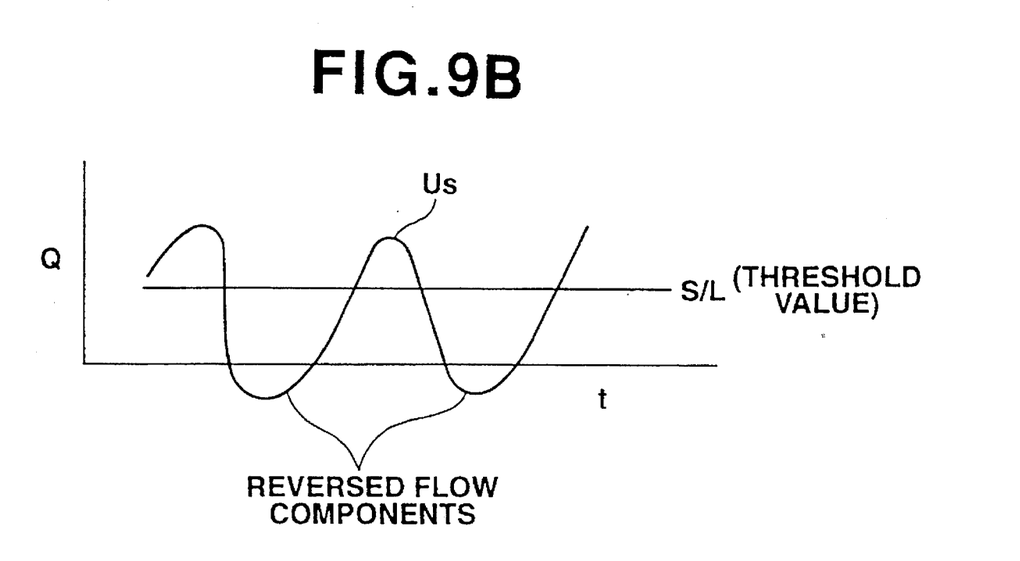

FIG. 9B shows the output voltage signal waveform Us from the airflow meter 9 used in the embodiment, the airflow meter 9 being the type of airflow meter which detects the intake air flow quantity with respect to the intake air stream in both of the forward and reverse directions.

Such a type of airflow meter 9 used in the embodiment outputs the voltage signal Us as shown in FIG. 9B. In a case where the intake air flow in the reverse direction occurs, the reverse flow component is output as shown in FIG. 9B. Hence, the intake air pulsation periods described in FIG. 6 can accurately be measured. Consequently, the accurate self-diagnosis of failure in the VTC can be made.

It is noted that a threshold value S/L shown in each of FIGS. 9A and 9B denotes an average value of the intake air quantity detected by the corresponding one of the conventional airflow meter shown in FIG. 9A and detected by the airflow meter 9 used in the embodiment shown in FIG. 1A and FIG. 9B. (The average value may be a moving average of the output voltage signal of the airflow meter.) The details of the intake air pulsation and structure of the airflow meter which can detect the intake air quantity in both the forward direction and the reverse direction is also exemplified by FIG. 12 of a Japanese Utility Model Registration Application Second Publication No. Heisei 6-10260 published on Mar. 16, 1994.)

Figure 7A:
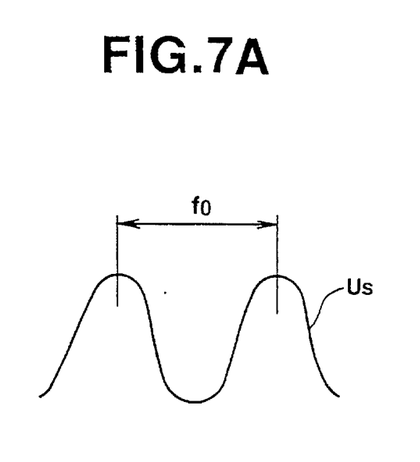
FIGS. 7A and 7B are characteristic graphs for explaining periods of air intake pulsations during the operation and non-operation of the variable valve timing control system, respectively.
Figure 7B:
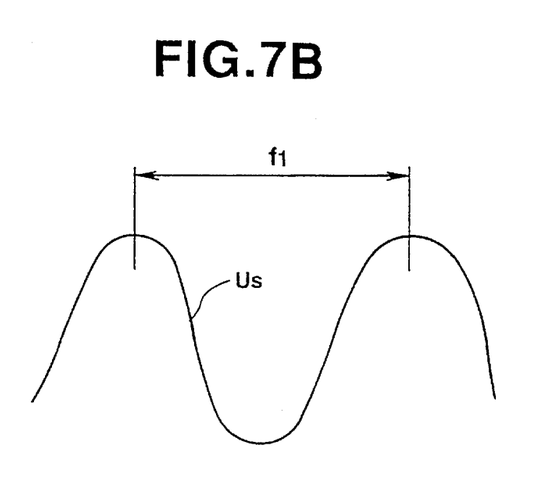

It is also noted that although, at the steps S6 and S8, the first and second intake air pulsation periods are measured, first and second frequencies of the intake air pulsations with the solenoid 4 turned on and off may alternatively be measured with a DC component of the output voltage signal Us shown in FIGS. 7A and 7B eliminated using a frequency analyzer and an absolute difference between the first and second frequencies may be compared with another frequency reference value at the step 810. It is further noted that, at the steps S6 and S8, first and second amplitudes of the intake pulsations may be measured with the solenoid turned on and off with the DC component of the output voltage signal Us eliminated and an absolute difference between the first amplitude and second amplitude may be compared with a corresponding amplitude reference value at the step S10.

What is claimed is:

1. A diagnosing apparatus for an internal combustion engine, comprising:

a) a variable valve timing mechanism arranged on a cam sprocket of an intake air system to variably control a phase between an engine crankshaft and an intake air system cam shaft;

b) solenoid means for controlling a hydraulic supply to operate the variable valve timing mechanism to control said phase at a first phase deviation in response to a predetermined control signal and to not operate the variable valve timing mechanism to return said phase to a second phase deviation in response to a predetermined non-control signal;

c) engine driving condition detecting means for detecting an engine driving condition;

d) controlling means for generating and outputting said control signal and non-control signal according to the detected engine driving condition;

e) intake air quantity detecting means for detecting an intake air quantity of an intake air flow in the intake air system of the engine;

f) intake air pulsation generating region estimating means for estimating whether the engine falls in an intake air pulsation region according to the detected engine driving condition;

g) first intake air pulsation characteristic determining parameter measuring means for measuring a first value of a characteristic determining parameter of the intake air pulsation on the basis of a result of the detection of the intake air quantity detecting means when the intake air pulsation generating region estimating means estimates that the engine falls in the intake air pulsation region and when the controlling means generates and outputs the predetermined control signal to said solenoid means;

h) second intake air pulsation characteristic determining parameter measuring means for measuring a second value of the characteristic determining parameter of the intake air pulsation when the controlling means generates and outputs the non-control signal to said solenoid means;

i) intake air pulsation characteristic determining parameter comparing means for comparing both of said first and second values of the characteristic determining parameter of the intake air pulsations measured by said first and second intake air pulsation characteristic determining parameter measuring means; and j) diagnosing means for diagnosing whether a failure in at least one of said variable valve timing mechanism and said solenoid means occurs on the basis of a result of comparison between the first and second values of the characteristic determining parameter measured by said first and second intake pulsation characteristic determining parameter measuring means.

2. A diagnosing apparatus for an internal combustion engine as claimed in claim 1, wherein said diagnosing means comprises calculating means for calculating an absolute value of a difference between the first and second values of the characteristic determining parameter of the intake air pulsation and comparing means for comparing said absolute value with a predetermined diagnostic reference value, and wherein said diagnosing means diagnoses the failure in the at least one of the variable valve timing mechanism and the solenoid means when said absolute value is below the predetermined value.

3. A diagnosing apparatus for an internal combustion engine as claimed in claim 2, wherein said intake air pulsation generating region estimating means estimates the intake air pulsation region in which the intake air pulsation occurs on the basis of an opening angle indicative signal of an engine throttle valve and an engine load indicative signal of an engine load, said engine driving condition detecting means comprising engine load detecting means and engine throttle valve opening angle detecting means.

4. A diagnosing apparatus for an internal combustion engine as claimed in claim 3, further comprising forceful switching means for forcefully switching from a control signal output mode to a non-control signal output mode, wherein said non-control signal is supplied to the solenoid means.

5. A diagnosing apparatus for an internal combustion engine as claimed in claim 1, further comprising warning means for providing a warning signal when said diagnosing means diagnoses the failure in at least one of the variable valve timing control mechanism and the solenoid means.

6. A diagnosing apparatus for an internal combustion engine as claimed in claim 1, wherein said characteristic determining parameter of the intake air pulsation is a period of intake air pulsation.

7. A diagnosing apparatus for an internal combustion engine, comprising:
 a) variable valve timing control system having a solenoid, said solenoid being excited in response to a first predetermined level signal and being deenergized in response to a second predetermined level signal;
 b) an intake airflow meter arranged in an intake air system of the engine to detect an intake air quantity entering the engine and output a signal indicating the intake air quantity;
 c) engine driving condition detecting means for detecting at least one engine driving condition determining parameter;
 d) intake air pulsation region determining means for determining whether the engine falls in an engine driving region where intake air pulsation occurs on the basis of the engine driving condition determining parameter;
 e) first intake air pulsation period measuring means for measuring at least one of a first intake air pulsation period and a frequency of the intake air pulsation when said variable valve timing control system is operated to excite the solenoid in response to the first predetermined level signal and when said intake air pulsation region determining means determines that the engine falls in the engine driving region;
 f) second intake air pulsation period measuring means for measuring at least one of a second intake air pulsation period and the frequency of the intake air pulsation when said variable valve timing control system is operated to deenergize the solenoid in response to the second predetermined level signal and when said intake air pulsation region determining means determines that the engine falls in the engine driving region;
 g) intake air pulsation comparing means for comparing said first and second intake air pulsation periods or frequencies measured by the first and second intake air pulsation period measuring means; and
 h) determining means for determining whether a failure in said variable valve timing control system occurs according to a result of the comparison made by the intake air pulsation comparing means.

8. A diagnosing apparatus for an internal combustion engine as claimed in claim 7, wherein said determining means constitutes a control unit, said control unit generating and outputting the first and second predetermined level signals according to the detected engine driving condition determining parameter.

9. A diagnosing apparatus for an internal combustion engine as claimed in claim 8, wherein said engine driving condition detecting means comprises: an engine throttle valve opening angle sensor to detect an opening angle (TVO) of an engine throttle valve; engine revolution speed detecting means for detecting an engine revolution speed (N) of the engine; and basic engine fuel injection quantity determining means for determining a basic fuel injection quantity (Tp) according to an output signal of said intake airflow meter and the engine revolution speed (N), and wherein said intake air pulsation region determining means determines that the engine falls in the engine driving region on the basis of whether the opening angle of the engine throttle valve detected by the engine throttle valve opening angle sensor is in a full open state and an engine load determined according to the engine revolution speed (N) and the fuel injection quantity (Tp) is in a relatively high load.

10. A diagnosing apparatus for an internal combustion engine as claimed in claim 9, further comprising: confirming means for monitoring an output signal fluctuation of the airflow meter and confirming that intake air pulsation is occurring according to a monitoring result when said intake air pulsation region determining means determines that the engine falls in the engine driving region.

11. A diagnosing apparatus for an internal combustion engine as claimed in claim 10, further comprising forceful turning on means for forcefully supplying said first predetermined level signal to said solenoid of said variable valve timing control system so as to turn on the variable timing control system when said confirming means confirms that the engine falls in the engine driving region.

12. A diagnosing apparatus for an internal combustion engine as claimed in claim 11, wherein said first intake pulsation period measuring means measures the first intake air pulsation period when said forceful turning on means supplies the first predetermined level signal to said solenoid of said variable valve timing control system.

13. A diagnosing apparatus for an internal combustion engine as claimed in claim 12, further comprising forceful turning off means for forcefully supplying said second predetermined level signal to said solenoid of said variable valve timing control system after said forceful turning on means forcefully supplies the first predetermined level signal to said solenoid of said variable valve timing control system and said first intake air pulsation period measuring means measures the first intake air pulsation period.

14. A diagnosing apparatus for an internal combustion engine as claimed in claim 13, wherein said second intake air pulsation period measuring means measures the second intake air pulsation period with the second predetermined level signal supplied to the solenoid of said variable valve timing control system.

15. A diagnosing apparatus for an internal combustion engine as claimed in claim 14, wherein said intake air pulsation comparing means calculates an absolute value of a difference between the first and second intake air pulsation periods as follows: $\Delta f=|f_0-f_1|$, wherein $f_0$ denotes the first intake air pulsation period and $f_1$ denotes the second intake air pulsation period, and compares the calculated absolute value $\Delta f$ with a reference value X, said reference value being a threshold value equal to or above which the variable valve timing control system normally operates.

16. A diagnosing apparatus for an internal combustion engine as claimed in claim 15, wherein said reference value is determined according to a threshold value of a boundary that indicates the intake that air pulsation period is appropriately varied according to the variable valve timing control system operation.

17. A diagnosing apparatus for an internal combustion engine as claimed in claim 16, wherein said determining means determines that the failure in said variable valve timing control system occurs when $\Delta f<X$.

18. A diagnosing apparatus for an internal combustion engine as claimed in claim 17, wherein said intake airflow meter is constructed and arranged to detect the intake air quantity of an intake air flow in both directions of toward engine cylinders of the engine and against the engine cylinders, and wherein said first predetermined level signal is a voltage signal having a level sufficient to excite the solenoid, and said second predetermined level signal is a voltage signal having a zero level.

19. A diagnosing apparatus for an internal combustion engine as claimed in claim 18, further comprising warning signal generating means for generating a warning signal when said determining means determines the failure of the variable valve timing control system.

20. A diagnosing method for an internal combustion engine having a variable valve timing control system having a solenoid, said solenoid being excited in response to a first predetermined level signal so that the variable valve timing control system is operated and being deenergized in response to a second predetermined level signal so that the variable valve timing control system is not operated, said diagnosing method comprising the steps of:

a) detecting an intake air quantity of the engine and outputting a signal indicating the intake air quantity;

b) detecting at least one engine driving condition determining parameter;

c) determining whether the engine falls in an engine driving region wherein intake air pulsation occurs on the basis of the engine driving condition determining parameter;

d) measuring at least one of a first intake air pulsation period and a frequency of the intake air pulsation when said variable valve timing control system is operated according to the excited solenoid in response to the first predetermined level signal and when, at the step c), it is determined that the engine falls in the engine driving region;

e) measuring at least one of a second intake air pulsation period and the frequency of the intake air pulsation when said variable valve timing control system is operated according to the deenergized solenoid in response to the second predetermined level signal and when, at the step c), it is determined that the engine falls in the engine driving region;

f) comparing said first and second intake air pulsation periods or frequencies measured in steps d) and e); and g) determining whether a failure in said variable valve timing control system occurs according to a result of the comparison at step f).

21. A diagnosing method for an internal combustion engine having a variable valve timing control system having a solenoid, said solenoid being excited in response to a first predetermined level signal so that the variable valve timing control system is operated and being deenergized in response to a second predetermined level signal so that the variable valve timing control system is nor operated, as claimed in claim 20, wherein said diagnosing method further comprises the step of: outputting a warning signal when, at the step h), it is determined that the failure in said variable valve timing control system occurs.

* * * * *